(12) United States Patent
Prasse

(10) Patent No.: US 8,710,120 B2
(45) Date of Patent: Apr. 29, 2014

(54) CROSS-LINKABLE COMPOSITIONS

(75) Inventor: Marko Prasse, Glaubitz (DE)

(73) Assignee: Wacker Chemie AG, Munich (DE)

( * ) Notice: Subject to any disclaimer, the term of this patent is extended or adjusted under 35 U.S.C. 154(b) by 191 days.

(21) Appl. No.: 13/500,202

(22) PCT Filed: Sep. 29, 2010

(86) PCT No.: PCT/EP2010/064458
§ 371 (c)(1),
(2), (4) Date: Apr. 4, 2012

(87) PCT Pub. No.: WO2011/042340
PCT Pub. Date: Apr. 14, 2011

(65) Prior Publication Data
US 2012/0202919 A1    Aug. 9, 2012

(30) Foreign Application Priority Data

Oct. 8, 2009 (DE) .......................... 10 2009 045 503

(51) Int. Cl.
*C08K 9/04* (2006.01)
*C08K 3/26* (2006.01)
*C08L 83/04* (2006.01)

(52) U.S. Cl.
CPC ... *C08K 9/04* (2013.01); *C08K 3/26* (2013.01); *C08L 83/04* (2013.01)
USPC ............................ 523/200; 524/425; 524/588

(58) Field of Classification Search
CPC ............ C08K 9/04; C08K 3/26; C08L 83/04
USPC .................................... 523/200; 524/425, 588
See application file for complete search history.

(56) References Cited

U.S. PATENT DOCUMENTS

| | | | |
|---|---|---|---|
| 5,135,967 A * | 8/1992 | Aumann et al. | 523/210 |
| 5,238,969 A | 8/1993 | Guarneri et al. | |
| 7,547,467 B2 * | 6/2009 | Olson et al. | 428/1.3 |
| 2004/0087682 A1 | 5/2004 | Drummond | |
| 2004/0087752 A1 | 5/2004 | Schindler et al. | |
| 2007/0208108 A1 * | 9/2007 | Wakabayashi et al. | 523/200 |
| 2008/0033100 A1 | 2/2008 | Scholey et al. | |
| 2010/0041810 A1 | 2/2010 | Wakabayashi et al. | |

FOREIGN PATENT DOCUMENTS

| | | |
|---|---|---|
| EP | 1370602 B1 | 8/2004 |
| JP | 05-500077 A | 1/1993 |
| JP | 2008-222493 A | 9/2008 |
| WO | 2008/062866 A1 | 5/2008 |
| WO | 2009/120868 A2 | 10/2009 |

* cited by examiner

*Primary Examiner* — Vickey Nerangis
(74) *Attorney, Agent, or Firm* — Brooks Kushman P.C.

(57) ABSTRACT

Crosslinkable compositions contain a calcium carbonate-rich filler coated with a carboxylic acid of the formula $$R^4-(OCR^3{}_2-C(=O)OH)_y.$$

The compositions exhibit low modulus, good adhesion to substrates, and low skin formation time.

10 Claims, No Drawings

CROSS-LINKABLE COMPOSITIONS

CROSS-REFERENCE TO RELATED APPLICATIONS

This application is the U.S. national phase of PCT Appln. No. PCT/EP2010/064458 filed Sep. 29, 2010, which claims priority to German Patent Application No. DE 10 2009 045 503.5 filed Oct. 8, 2009.

BACKGROUND OF THE INVENTION

1. Field of the Invention

The invention relates to crosslinkable compositions, especially to compositions which are based on organo-silicon compounds, which comprise specially coated basic fillers, which are storable with exclusion of water and which are crosslinkable on ingress of water at room temperature to give elastomers, to processes for production thereof and to shaped bodies produced therefrom.

2. Description of the Related Art

One-component sealing compositions which are storable with exclusion of water, vulcanize on ingress of water at room temperature to give elastomers and eliminate alcohols in doing so are known. These products are used in large volumes, for example in the construction industry. These mixtures are based on polymers terminated by silyl groups bearing reactive substituents such as OH groups or hydrolyzable groups, for example alkoxy groups. Typically, such compositions also contain calcium carbonates as fillers.

Frequently, stearic acid-coated calcium carbonates are used since they absorb less moisture compared to uncoated calcium carbonates. Such products are supplied on the market in a wide variety. However, the coated calcium carbonates usually worsen adhesion, especially on substrates such as concrete. JP2008222493 A2 describes the coating of calcium carbonates with polymeric fatty acids, but these as a filler in RTV1 compositions likewise adversely affect adhesion to concrete.

The addition of organic acids, such as n-octanoic acid or neodecanoic acid, to RTV1 compositions has likewise been described many times. However, the addition leads to an increase in the modulus and to poorer adhesion on concrete.

SUMMARY OF THE INVENTION

The invention provides crosslinkable compositions comprising
(A) at least one crosslinkable compound and
(B) calcium carbonate-containing filler (B0) surface-treated with carboxylic acids (C) of the formula

(I)

where
$R^3$ may be identical or different and is a hydrogen atom or a monovalent, optionally substituted hydrocarbyl radical,
$R^4$ is a y-valent, carbon-bonded, optionally substituted hydrocarbyl radical which may be interrupted by oxygen atoms, and
y is an integer from 1 to 3.

DETAILED DESCRIPTION OF THE PREFERRED EMBODIMENTS

The inventive compositions are preferably compositions crosslinkable by condensation reaction, especially compositions which are based on organosilicon compounds, which are storable with exclusion of water and which are crosslinkable on ingress of water at room temperature to give elastomers.

In the context of the present invention, the term "condensable" radicals shall also be understood to mean those radicals which include an optional preceding hydrolysis step.

The compounds (A) used in accordance with the invention are preferably those selected from the group consisting of compounds (A1) of the formula

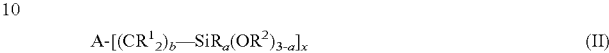

(II)

where
A is an x-valent polymer radical bonded via nitrogen, phosphorus, oxygen, sulfur, carbon or a carbonyl group,
R may be identical or different and is a monovalent, optionally substituted hydrocarbyl radical,
$R^1$ may be identical or different and is a hydrogen atom or a monovalent, optionally substituted hydrocarbyl radical which may be attached to the carbon atom via nitrogen, phosphorus, oxygen, sulfur or a carbonyl group,
$R^2$ may be identical or different and is a hydrogen atom or a monovalent, optionally substituted hydrocarbyl radical,
x is an integer from 1 to 10, preferably 1, 2 or 3, more preferably 1 or 2,
a is 0, 1 or 2, preferably 0 or 1, and
b is an integer from 1 to 10, preferably 1, 2, 3 or 4, more preferably 1, 2 or 3,
with the proviso that at least two $OR^2$ groups per molecule are present,
and
compounds (A2) of the formula

(III)

where
$R^5$ may be identical or different and each is an optionally substituted hydrocarbyl radical which may be interrupted by oxygen atoms,
Z may be identical or different and is a hydroxyl radical or a hydrolyzable radical,
c is 0, 1, 2 or 3, preferably 1 or 2, and
d is 0, 1, 2 or 3, preferably 0, 1 or 2, more preferably 0,
with the proviso that the sum of c+d is less than or equal to 4 and at least two Z radicals are present per molecule.

The compounds (A1) of the formula (II) preferably have a molecular weight of 2000 g/mol to 100,000 g/mol, more preferably of 5000 g/mol to 50,000 g/mol, in each case reported as the number average.

The R radical preferably comprises optionally substituted monovalent hydrocarbyl radicals having 1 to carbon atoms, more preferably alkyl radicals, the vinyl, 3,3,3-trifluoroprop-1-yl and phenyl radicals, especially the methyl radical.

Examples of R radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, isooctyl radicals and the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical, and the α- and the β-phenylethyl radical.

Examples of substituted R radicals are haloalkyl radicals, such as the 3,3,3-trifluoroprop-1-yl radical, the 2,2,2,2',2',2'-hexafluoroisopropyl radical and the heptafluoroisopropyl radical, haloaryl radicals such as the o-, m- and p-chlorophenyl radicals, and the 2-methoxyethyl radical, the 2-methoxypropyl radical and the 2-(2-methoxyethoxy)ethyl radical.

Examples of $R^1$ radicals are a hydrogen atom, the radicals specified for R, and optionally substituted hydrocarbyl radicals bonded to the carbon atom via nitrogen, phosphorus, oxygen, sulfur, carbon or a carbonyl group.

Preferably, the $R^1$ radical is a hydrogen atom or a hydrocarbyl radical having 1 to 20 carbon atoms, especially a hydrogen atom.

Examples of $R^2$ radicals are a hydrogen atom and the radicals specified for R. Preferably, the $R^2$ radical is hydrogen or a hydrocarbyl radical having 1 to 6 carbon atoms, more preferably hydrogen, a methyl radical or an ethyl radical.

The A radical preferably comprises organic polymer radicals which, as the polymer chain, contain polyoxyalkylenes such as polyoxyethylene, poly-oxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymer and polycarbonates, and are bonded via —O—C(=O)—NH—, —NH—C(=O)O—, —NH—C(=O)—NH—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'—, —CR'$_2$—, —P(=O)(OR')$_2$—, —O—CH$_2$—C(OH)H—CH$_2$—NR'—, —O—CH$_2$—C(OH)H—CH$_2$—S—, —O—CH$_2$—C(OH)H—CH$_2$—C(=O)—, —O—CH$_2$—C(OH)H—CH$_2$—O—,

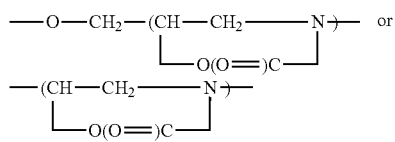

to the —[(CR$^1_2$)$_b$—SiR$_a$(OR$^2$)$_{3-a}$] group, where R' may be identical or different and is a hydrogen atom or is as defined for R.

More preferably, the A radical is an polyoxyalkylene or polyacrylate radical, especially polyoxyalkylene radicals which are bonded via —O—C(=O)—NH—, —C(=O)—O—, —C(=O)—O—, —O—, —O—CH$_2$—C(OH)H—CH$_2$—NR'—, —O—CH$_2$—C(OH)H—CH$_2$—S—, —O—CH$_2$—C(OH)H—CH$_2$—C(=O)— or —O—CH$_2$—C(OH)H—CH$_2$—O— to the —[(CR$^1_2$)$_b$—SiR$_a$(OR$^2$)$_{3-a}$] group, where R' may be identical or different and is a hydrogen atom or is as defined for R.

If the A radical is polyoxyalkylene radicals, these preferably comprise repeat units of the formula

where
$R^7$ may be identical or different and is an optionally substituted divalent hydrocarbyl radical having 1 to 12 carbon atoms, which may be linear or branched.

The polyoxyalkylene radicals A preferably contain at least 50%, more preferably at least 70%, of repeat units of the formula (IV), based in each case on the total number of repeat units.

In addition to the repeat units of the formula (IV), the polyoxyalkylene radicals A may also contain further units, for example amide, urea, urethane, thiourethane, alkylene, arylene, ester, carbonate, imide or imine units.

Examples of the $R^7$ radical are —CH$_2$—, —CH$_2$—CH$_2$—, —CH$_2$—CH(CH$_3$)—, —CH$_2$—CH$_2$—CH$_2$—, —CH$_2$—CH(—CH$_2$—CH$_3$)—, —CH(CH$_3$)—CH(CH$_3$)—, —CH$_2$—CH$_2$—CH$_2$—CH$_2$— and —CH$_2$—C(CH$_3$)$_2$—. Preferably, the $R^7$ radical is a divalent, optionally substituted hydrocarbyl radical having 1 to 4 carbon atoms, more preferably a divalent hydrocarbyl radical having 1 to 4 carbon atoms, and most preferably —CH$_2$—CH$_2$— and —CH$_2$—CH(CH$_3$)—, especially —CH$_2$—CH(CH$_3$)—.

The compounds (A1) used in accordance with the invention are preferably polymers which contain polypropylene glycols, polyurethanes or polyacrylates and have silyl groups, and which contain hydroxyl groups or other condensable groups and are capable of forming siloxane bonds, particular preference being given to polymers which contain polypropylene glycols or polyurethanes and have silyl groups, and contain hydroxyl groups or other condensable groups and are capable of forming siloxane bonds.

Examples of component (A1) are organic polymers having tris(organyloxy)silylalkyl groups or bis(organyloxy)-methylsilylalkyl groups, such as polyacrylates, vinyl polymers, polyurethanes and polyglycols, which may be linear or branched. These polymers can be prepared by known processes, such as addition reactions, for example hydrosilylation, Michael addition, Diels-Alder addition, the addition of isocyanate onto epoxides or onto reactive groups having active hydrogen, such as amines, amides, hydroxyl or mercapto groups, the addition of epoxides onto reactive groups having active hydrogen, such as amines, carbonyl groups, phenols or mercapto groups, and the addition of aziridines onto carbonyl groups, or the copolymerization of vinylsilanes with monomers having an organic double bond, or the grafting of vinylsilanes onto vinyl polymers, or the copolymerization of vinylsilanes and/or methacryloyloxypropylsilanes and/or methacryloyloxymethylsilanes with monomers having an organic double bond, it being possible by employment of controlled free-radical polymerization by the nitroxyl-controlled CFRP, ATRP or RAFT process to prepare polymers with narrow molar mass distribution which bear the silyl groups at the polymer ends. The preparation methods can be combined with one another if appropriate.

However, components (A1) used may also be copolymers composed of siloxane blocks and organic polymers, as described, for example, in EP-B11 370 602, which is incorporated herein by reference.

The polymers (A1) used in accordance with the invention may be homopolymers or else copolymers, each of which may be linear or branched. Component (A1) may have the —[(CR$^1_2$)$_b$—SiR$_a$(OR$^2$)$_{3-a}$] groups at any sites in the polymer, for instance in chain and/or terminal positions.

Preferably, in formula (III), the sum of c+d is less than or equal to 3.

The $R^5$ radical preferably comprises monovalent hydrocarbyl radicals having 1 to 18 carbon atoms, which are optionally substituted by halogen atoms, amino groups, ether groups, ester groups, epoxy groups, mercapto groups, cyano groups or (poly)glycol radicals, the latter being formed from oxyethylene and/or oxypropylene units, more preferably alkyl radicals having 1 to 12 carbon atoms, especially the methyl radical. However, the $R^5$ radical may also comprise divalent radicals which, for example, join two silyl groups to one another.

Examples of the $R^5$ radical are the examples specified for the R radical.

Examples of divalent $R^5$ radicals are polyisobutylenediyl radicals, polymethacrylic acid methyl ester diyl radicals, polymethacrylic acid butyl ester diyl radicals and propanediyl-terminated polypropylene glycol radicals.

Examples of Z radicals are hydroxyl groups, acetoxy radicals, oximato radicals and organyloxy radicals —$OR^6$ where $R^6$ denotes monovalent, optionally substituted hydrocarbyl radicals which may be interrupted by oxygen atoms, for example methoxy radicals, ethoxy radicals, alkoxyethoxy radicals and hydroxyl-containing radicals, such as 2-hydroxypropoxy, 2-hydroxy-1-methylpropoxy, 2-hydroxybutoxy, 1-hydroxy-2-methylethoxy or 2-hydroxyethoxy radicals.

Examples of $R^6$ radicals are the radicals specified for R.

Preferably, the Z radical comprises hydroxyl groups, oximato radicals and organyloxy radicals —$OR^6$, more preferably hydroxyl groups and organyloxy radicals —$OR^6$, especially hydroxyl groups and methoxy and ethoxy radicals, where $R^6$ is as defined above.

Preferably, the compounds (A2) used in accordance with the invention are essentially linear organopolysiloxanes, particular preference being given to those of the formula

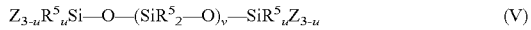

$$Z_{3-u}R^5{}_uSi—O—(SiR^5{}_2—O)_v—SiR^5{}_uZ_{3-u} \qquad (V)$$

where
$R^5$ and Z each have one of the definitions given above,
v is an integer from 30 to 3000 and
u may be identical or different and is 0, 1 or 2.

Preferably, v is an integer from 200 to 2000.

Preferably, u is 2 when Z is defined as a hydroxyl group, and u is 0 or 1 when Z has a definition other than a hydroxyl group.

Examples of organosilicon compounds (A2) are
$(MeO)_2MeSiO[SiMe_2O]_{200-2000}SiMe(OMe)_2$,
$(MeO)_2MeSiO[SiMe_2O]_{200-2000}SiMe(OEt)_2$,
$(MeO)_3SiO[SiMe_2O]_{200-2000}SiMe(OMe)_2$,
$(MeO)_3SiCH_2CH_2[SiMe_2O]_{200-2000}SiMe_2$-$CH_2CH_2Si(OMe)_3$,
$(HO) Me_2SiO[SiMe_2O]_{200-2000}SiMe_2(OH)$.
$(EtO)_2MeSiO[SiMe_2O]_{200-2000}SiMe(OEt)_2$,
$(HO)MeViSiO[SiMe_2O]_{200-2000}SiMeVi(OH)$.
$(MeO)_2MeSiO[SiMe_2O]_{200-2000}SiVi(OMe)_2$.
$(MeO)_2MeSiO[SiMe_2O]_{200-2000}SiVi(OMe)(OEt)$,
$(Et(Me)C{=}NO)_2MeSiO[SiMe_2O]_{200-2000}SiVi \quad (ON{=}C(Me)Et)_2$.
$(Et (Me)C{=}NO)_2MeSiO[SiMe_2O]_{200-2000}Si (ON{=}C(Me)Et)_3$,
$(Et(Me)C{=}NO) (MeO)MeSiO[SiMe_2O]_{200-2000}SiVi(OMe)(ON{=}C(Me) Et)$,
$(Et(Me)C{=}NO)_2MeSiO[SiMe_2O]_{200-2000}Si(OMe)(ON{=}C(Me)Et)_2$.
$(Et(Me)C{=}NO)_2MeSiO[SiMe_2O]_{200-2000}SiVi (OMe)_2$,
$(EtO)_2(Morph—CH_2) SiO[SiMe_2O]_{200-2000}Si (CH_2$-$Morph)(OEt)_2$,
$(MeO)_2(cHex$-$NHCH_2CH_2CH_2)SiO[SiMe_2O]_{200-2000}Si(CH_2CH_2CH_2NH$-$cHex) (OMe)_2$, $(EtO)_2 (cHex—NHCH_2) SiO[SiMe_2O]_{200-2000}Si (CH_2NH$-$cHex)(OEt)_2$.
$(MeO)_2ViSiO[SiMe_2O]_{200-2000}SiVi (OMe)_2$ and
$(EtO)(MeO) ViSiO[SiMe_2O]_{200-2000}SiVi(OEt) (OMe)$.
where Me is a methyl radical, Et an ethyl radical, cHex a cyclohexyl radical, Morph an N-morpholino radical and Vi a vinyl radical.

Compounds (A2) used in accordance with the invention are preferably
$(MeO)_2MeSiO[SiMe_2O]_{200-2000}SiMe(OMe)_2$,
$(HO) Me_2SiO[SiMe_2O]_{200-2000}SiMe_2 (OH)$,
$(MeO)_2MeSiO[SiMe_2O]_{200-2000}SiVi (OMe)_2$,
$(Et(Me)C{=}NO)_2MeSiO[SiMe_2O]_{200-2000}SiVi(ON{=}C(Me) Et)_2$,
$(Et(Me)C{=}NO)_2MeSiO[SiMe_2O]_{200-2000}Si \quad (ON{=}C(Me)Et)_3$,
$(EtO)_2(Morph$-$CH_2) \quad SiO[SiMe_2O]_{200-2000}(CH_2$-$Morph)(OEt)_2$ and
$(MeO)_2ViSiO[SiMe_2O]_{200-2000}SiVi(OMe)_2$, particular preference being given to
$(MeO)_2MeSiO [SiM_2O]_{200-2000}SiMe (OMe)_2$,
$(HO)Me_2SiO [SiM_2O]_{200-2000}SiMe_2 (OH)$
$(MeO)_2MeSiO[SiM_2O]_{200-2000}SiVi(OMe)_2$,
$(EtO)_2$-$Morph$-$CH_2SiO \quad [SiM_2O]_{200-2000}SiCH_2$-$Morph(OEt)_2$ and
$(MeO)_2ViSiO[SiM_2O]_{200-2000}SiVi(OMe)_2$,
where Me is a methyl radical, Et an ethyl radical,
Morph an N-morpholino radical and Vi a vinyl radical.

The compounds (A1) and (A2) used in accordance with the invention are commercial products or can be prepared by standard methods in silicon chemistry.

Preference is given to using, as component (A), either compounds (A1) or compounds (A2), or mixtures of compounds (A1) and (A2), one of the two compounds being present in these mixtures in an amount below 5% by weight. More preferably, component (A) comprises either compounds (A1) or compounds (A2).

The compounds (A) used in accordance with the invention have a viscosity of preferably 100 to 1,000,000 mm²/s, more preferably of 1,000 to 350,000 mm²/s, in each case at 25° C.

Examples of uncoated calcium carbonate-containing fillers (B0) which form the basis of component (B) used in accordance with the invention are ground natural chalk, ground natural limestone or natural marble with a calcium carbonate content of preferably more than 85% by weight, and precipitated calcium carbonate with a calcium carbonate content of preferably more than 95% by weight.

In addition, it is possible for the fillers (B0) to include traces of salts and oxides of magnesium, silicon, aluminum, calcium, potassium, sodium, titanium and iron, and other salts and oxides which occur in natural raw materials. It is additionally possible for up to 2% by weight of processing aids, such as grinding aids or precipitation aids, to be present in the fillers.

The uncoated calcium carbonate-containing fillers (B0) which form the basis of component (B) used in accordance with the invention are not coated with organic or organosilicon substances. Fillers (B0) are preferably essentially free of organic or organosilicon substances, for example fatty acids such as stearic acid, resin acids, silanes such as methyltrimethoxy-silane or n-octyltriethoxysilane, and siloxanes such as polydimethylsiloxane or polymethylhydrosiloxane, and they are more preferably completely free of organic or organosilicon substances.

The calcium carbonate-containing fillers (B0) used in accordance with the invention preferably comprise ground natural limestone with a calcium carbonate content of more than 85% by weight, natural marble with a calcium carbonate content of more than 85% by weight and precipitated calcium carbonate with a calcium carbonate content of more than 95% by weight, particular preference being given to ground natural limestone with a calcium carbonate content of more than 90% by weight, natural marble with a calcium carbonate content of more than 90% by weight and precipitated calcium carbonate with a calcium carbonate content of more than 95% by weight.

The filler (B0) used in accordance with the invention preferably has a moisture content of less than 0.5% by weight, more preferably of 0.3 to 0.01% by weight. In order to obtain the desired moisture content of the filler (B0), an optional drying of the filler may be advantageous. This can be accomplished, for example, by heating, extractive blowing with hot gases, vacuum treatment, treatment by microwave, or a combination of the processes.

"Vacuum" in the context of the present invention is understood to mean pressures in the range from 10 to 300 mbar absolute.

Preferred components (B0) are white to gray fillers, which is advantageous particularly for use in sealing compositions. The brightness of component (B0) used in accordance with the invention is preferably greater than 85%, measured to ISO 2470 at 457 nm. In the case of use of natural raw materials (B0), excessively colored particles are preferably excluded.

In the case of use of ground natural limestones and marble as component (B0), as well as calcium carbonate, it is also possible for magnesium carbonate and oxides of strontium, barium, manganese, silicon, iron, titanium, potassium, sodium and aluminum to occur. The main minerals are calcite, aragonite and dolomite.

The mean particle size ($D_{50}$) of ground natural limestones and marble (B0) is preferably in the range from 0.2 to 30 μm, more preferably 0.2 to 10 μm.

The BET surface area of ground natural limestones and marble (B0) is preferably in the range from 0.5 to 10 $m^2/g$, more preferably 1 to 10 $m^2/g$.

In the case of use of precipitated calcium carbonates, the calcium carbonate content is preferably more than 99% by weight. The particles are in various crystal structures or particle shapes, such as rod shape in somatoids or scalenohedra, rhombohedra, prisms, platelets, needle assemblies or sphere shape.

The mean particle size ($D_{50}$) of precipitated calcium carbonates (B0) is in the range from 0.02 to 1 μm, more preferably 0.03 to 0.6 μm.

The BET surface area of precipitated calcium carbonates (B0) is in the range from preferably 5 to 40 $m^2/g$, more preferably 6 to 35 $m^2/g$.

Examples of $R^3$ radicals are a hydrogen atom and the radicals specified for R.

Preferably, the $R^3$ radical is a hydrogen atom or a hydrocarbyl radical having 1 to 6 carbon atoms, more preferably a hydrogen atom and the methyl radical, especially a hydrogen atom.

Examples of $R^4$ radicals are optionally substituted hydrocarbyl radicals having 2 to 50 carbon atoms, which may be interrupted by oxygen atoms, such as $CH_3OCH_2CH_2$—, $CH_3OCH_2CH_2OCH_2CH_2$—, $CH_3$—O—$(CH_2CH_2O)_{2-20}CH_2CH_2$—, $CH_3(CH_2)_{11-13}O(CH_2CH_2O)_{0-20}CH_2CH_2$—, $CH_3(CH_2)_{5-7}CH$—$CH(CH_2)_8$—O—$(CH_2CH_2O)_{0-20}CH_2CH_2$—, $C_9H_{19}C_{16}H_4O(CH_2CH_2O)_{0-20}CH_2CH_2$—, $(CH_3)_3CC_6H_4$—O—$(CH_2CH_2O)_{0-20}CH_2CH_2$—, —$CH_2CH_2$—, —$CH_2CH_2OCH_2CH_2$—, —$CH_2CH_2(OCH_2CH_2)_{2-20}$— and —$(CH_2CH_2O)_{1-8}CH_2CH(OCH_2CH_2-)_{1-8}CH_2(OCH_2CH_2)_{1-8}$—.

The $R_4$ radical preferably comprises optionally substituted hydrocarbyl radicals having 2 to 30 carbon atoms, which may be interrupted by oxygen atoms, more preferably optionally substituted hydrocarbyl radicals having 3 to 30 carbon atoms, which may be interrupted by oxygen atoms, especially the 2-methoxyethyl radical, the 2-(2-methoxyethoxy)ethyl radical and the 2-(2-alkoxyethoxy)ethyl radical.

Preferably, y is 1 or 2, more preferably 1.

Examples of carboxylic acids (C) with which fillers (B0) are coated are 3,6-dioxaheptanoic acid, 3,6,9-trioxadecanoic acid, 3,6-dioxaoctanedioic acid, 3,6,9-trioxaundecanedioic acid, poly(ethylene glycol) diacids such as poly(ethylene glycol) diacids with a molar mass of approximately 200 g/mol to approximately 600 g/mol, glycolic acid ethoxylate ethers such as glycolic acid ethoxylated 4-nonylphenyl ether with a mean molar mass of approximately 600 g/mol, glycolic acid ethoxylated 4-tert-butylphenyl ether with a mean molar mass of approximately 380 g/mol, glycolic acid ethoxylated oleyl ether with a mean molar mass of approximately 700 g/mol, glycolic acid ethoxylate lauryl ether with a mean molar mass of approximately 360 g/mol, approximately 460 g/mol or approx. 690 g/mol, preference being given to 3,6-dioxaheptanoic acid, 3,6,9-trioxadecanoic acid, 3,6-dioxaoctanedioic acid, 3,6,9-trioxaundecanedioic acid, poly(ethylene glycol) diacids with a molar mass of approximately 600 g/mol, glycolic acid ethoxylated 4-tert-butylphenyl ethers with a mean molar mass of approximately 380 g/mol and glycolic acid ethoxylated lauryl ethers with a mean molar mass of approximately 360 g/mol or approximately 460 g/mol, with particular preference being given to 3,6-dioxaheptanoic acid, 3,6,9-trioxadecanoic acid, 3,6,9-trioxaundecanedoic acid, poly(ethylene glycol) diacid with a molar mass of approximately 600 g/mol, and glycolic acid ethoxylated lauryl ethers with a mean molar mass of approximately 360 g/mol or approximately 460 g/mol.

Preferably, carboxylic acid (C) comprises compounds having a melting point at 1000 hPa of less than 20° C., more preferably compounds having a melting point at 1000 hPa of less than 0° C. and a molar mass of more than 100 g/mol, especially compounds having a melting point at 1000 hPa of less than 0° C. and a molar mass of 130 to 700 g/mol.

Component (B) used in accordance with the invention can be produced in various ways known per se, for example by
i) treating the dried filler (B0) with carboxylic acid (C),
ii) treating the moist filler (B0) with carboxylic acid (C) and then drying,
iii) stirring the dried filler (B0) with a liquid, such as compound (A), plasticizer (F) or organic solvent (L), and adding the carboxylic acid (C) and optionally further components,
iv) stirring the moist filler with a liquid, such as compound (A), plasticizer (F) or organic solvent (L), and adding the carboxylic acid (C) and optionally further components, and simultaneously or subsequently drying, preference being given to variants iii) and iv) and particular preference to variant iii).

In inventive variants i) and ii), the coating is effected preferably by spraying the untreated calcium carbonate-containing filler (B0) with the carboxylic acid (C).

The coating of the filler (B0) according to variants i) and ii) is preferably performed at temperatures of 10 to 150° C., more preferably of 20 to 100° C., and at an absolute pressure of preferably 0.1 kPa to 500 kPa, more preferably of 1 kPa to 110 kPa.

In variants iii) and iv), the mixture is preferably degassed and/or dried under reduced pressure. In these variants, the temperature can be regulated by the amounts of liquid used and the resulting paste viscosity. Less liquid increases the paste viscosity and hence, at the same stirrer speed, also the mixing energy introduced. As a result, higher temperatures are obtained. Simultaneous application of reduced pressure allows better degassing and drying of the composition. It is advantageous to previously homogenize the liquids with the carboxylic acid (C). More homogeneous coating of component (B0) is thus obtained.

In the production of component (B), the amounts used are guided by the BET surface area of component (B0) and the molar mass of the carboxylic acid (C).

Component (B) is preferably produced using carboxylic acid (C) in amounts of preferably 0.01 to 5 parts by weight, more preferably 0.03 to 3 parts by weight, especially 0.05 to 2 parts by weight, based in each case on 100 parts by weight of component (B0). Component (B) can be produced batchwise or continuously.

Preferably, component (B) comprises calcium carbonate-containing filler, the surface of which receives a partial or complete monomolecular layer of carboxylic acid (C), more preferably with 1 to 90% surface coverage, especially 1 to 75%.

The inventive compositions preferably contain component (B) in amounts of 1 to 500 parts by weight, more preferably 5 to 300 parts by weight, especially 10 to 200 parts by weight, based in each case on 100 parts by weight of component (A).

Apart from the above-described components used in accordance with the invention, the inventive compositions may comprise all further substances which are useful in crosslinkable compositions, for example catalysts (D), crosslinkers (E), plasticizers (F), fillers (G), adhesion promoters (H), additives (I) and organic solvents (L), with (D), (E), (F), (G) and (H) different than components (A), (B) and (C).

The catalysts (D) optionally used may be any useful condensation catalysts.

Examples of condensation catalysts (D) are titanium compounds such as tetra-tert-butyl orthotitanate, bis(ethylacetoacetato)titanium(IV) diisobutoxide, bis(ethylacetoacetato)titanium(IV) dimethoxide, bis(ethylacetoacetato)titanium(IV) diethoxide, bis(ethylacetoacetato)titanium(IV) monoethoxide monomethoxide or bis(ethylacetoacetato)titanium(IV) diisopropoxide; and organic tin compounds such as di-n-butyltin dilaurate, di-n-butyltin diacetate, di-n-butyltin oxide, di-n-butyltin dineodecanoate, di-n-butyltin diacetylacetonate, di-n-butyltin maleate, di-n-octyltin diacetate, di-n-octyltin dilaurate, di-n-octyltin oxide, di-n-octyltin maleate, di-n-octyltin di(2-ethyl)hexanoate, di-n-octyltin neodecanoate, di-n-octyltin isodecanoate, and the partial hydrolyzates thereof and reaction products of these compounds or partial hydrolyzates with alkoxysilanes such as tetraethoxysilane, methyltriethoxysilane, methyltrimethoxysilane, propyltrimethoxysilane, 3-aminopropyltrimethoxysilane, 3-aminopropyltriethoxysilane, 2-aminoethyl-3-aminopropyltrimethoxysilane, 2-aminoethyl-3-aminopropyltrimethoxysilane or the condensates or cocondensates thereof; esters, such as diisodecyl phthalate, di-n-octyl phthalate or diisodecyl phthalate, and mixtures or reaction products of titanium or tin compounds with phosphonic acids, phosphinic acids, phosphonic acid monoesters or phosphoric acid mono- or diesters.

In addition, the condensation catalysts (D) used may also be Lewis acids such as titanium tetrachloride, silicon tetrachloride, silicon tetrafluoride, tert-butyltrichlorogermane, methyltrichlorosilane, dimethyldichlorosilane, boron trifluoride, and the adducts thereof with amines, such as ethylamine, ethers, such as diethyl ether, or alcohols, such as methanol, ethanol or isopropanol.

Furthermore, the condensation catalysts (D) used may also be acids which contain B—OH, C(O)—OH, S(O)$_2$—OH and/or P(O)—OH groups, and HF, HCl, HBr or HI. Examples of such acids are carboxylic acids, boric acid, boronic acids, borinic acids, sulfonic acids, phosphoric acids, phosphonic acids and phosphinic acids or the condensation or cocondensation products thereof and the mono-, di- or triesters thereof with alcohols such as methanol, ethanol, isopropanol, n-propanol, tert-butanol, n-butanol, isobutanol, cyclohexanol, n-octyl alcohol, lauryl alcohol, or with silanols such as trimethylsilanol, methyldimethoxysilanol or triethoxysilanol. Examples are n-octanoic acid, neodecanoic acid, oleic acid, monoethyl adipate, monoethyl malonate, monooctyl borate, diisodecyl borate, butylboronic acid, aminoethyl dibutyl borinate, octylsulfonic acid, dodecylbenzenesulfonic acid, octyl phosphate, dioctyl phosphate, octylphosphonic acid, monomethyl octylphosphonate, monotrimethylsilyl octylphosphonate, laurylphosphonic acid, vinylphosphonic acid and diisooctylphosphinic acid.

In addition, the condensation catalysts (D) used may also be bases, more particularly compounds which contain basic nitrogen or phosphorus. Examples are amines, hydrazines, amidines, guanidines, tetraalkylammonium hydroxide or tetraalkylphosphonium hydroxide. Examples are ethylamine, butylamine, laurylamine, diethylamine, di-n-butylamine, triethylamine, triisooctylamine, trioctylamine, methyldioctylamine, N-diethylamino-3-propylamine, 1-O-tolylbiguanides, tetramethylguanidine, butylguanidine, 1,5-diazabicyclo[4.3.0]nonene, 1,4-diazabicyclo[2.2.2]octane, 1,8-diazabicyclo[5.4.0]undec-7-ene, 1,5,7-triazabicyclo[4.4.0]dec-5-ene, methyl-1,5,7-triazabicyclo[4.4.0]dec-5-ene, tetrabutylammonium hydroxide and tetrabutylphosphonium hydroxide (D).

Synergetic combinations of abovementioned catalysts can greatly accelerate the catalytic action on the hydrolysis of Si—OR and/or on the condensation reaction of Si—OH with Si—OH or Si—OR, and hence accelerate the curing or reduce the amount of catalyst.

Possible synergetic combinations are acid with bases, Lewis acids with bases and the abovementioned tin compounds with bases.

The catalysts (D) optionally used are preferably titanium compounds, organotin compounds, organic bases and organic bases with acids which contain C(O)—OH and/or P(O)—OH groups, particular preference being given to organotin compounds.

Components (D) optionally used are commercial products or are preparable by standard methods in chemistry.

If the inventive compositions contain component (D), the amounts are preferably 0.0001 to 5 parts by weight, more preferably 0.001 to 3 parts by weight, especially 0.005 to 2 parts by weight, based in each case on 100 parts by weight of component (A). The inventive compositions preferably contain catalyst (D).

The crosslinkers (E) optionally used in the inventive compositions may be any useful crosslinkers having at least two condensable radicals, for example silanes having at least two organyloxy groups.

More preferably, the optionally used crosslinkers (E) in the inventive compositions are silane crosslinkers such as tetramethoxysilane, tetraethoxysilane, tetrapropoxysilane, tetrabutoxysilane, methyltrimethoxysilane, dimethyldimethoxysilane, methyltriethoxysilane, methylvinyldimethoxysilane, vinyltrimethoxysilane, butyltrimethoxysilane, vinyltriethoxysilane, phenyltrimethoxysilane, diphenyldimethoxysilane, phenyltriethoxysilane, N-(trimethoxysilylmethyl) O-methylcarbamate, N-(dimethoxymethylsilylmethyl) O-methylcarbamate, (methacryloyloxymethyl)trimethoxysilane, (methacryloyloxymethyl)dimethoxymethylsilane, 1,2-bis-(trimethoxysilyl)ethane, 1,2-bis(triethoxysilyl)ethane, 1,1-dimethoxy-3,3,3-trimethyl-1-vinyldisiloxane, trimethylsiloxytrimethoxysilane, methyl-triacetoxysilane, ethyltriacetoxysilane, propyltriacetoxysilane, di-t-butoxydiacetoxysilane, methyltris(methylethylketoximo)silane and vinyl-tris(methylethylketoximo)silane, tetrakis(methylethylketoximo)silane, bis(N-methylbenzamido)ethoxymethylsilane, methyltris(propenyloxy)silane, vinyltris(propenyloxy)silane and the partial hydrolyzates thereof, which may optionally also be prepared by cohydrolysis, for example by cohydrolysis of methyltrimethoxysilane and dimethyldimethoxysilane.

The optionally used crosslinkers (E) optionally used in the inventive compositions are commercial products or can be prepared by processes known in silicon chemistry.

If the inventive compositions comprise crosslinkers (E), the amounts are preferably from 0.1 to 10 parts by weight, more preferably from 0.5 to 3 parts by weight, based in each case on 100 parts by weight of component (A). The inventive compositions preferably comprise crosslinkers (E).

Examples of plasticizers (F) are room temperature liquid polydimethylsiloxanes end-capped by trimethylsiloxy groups, especially those having viscosities at 25° C. in the range between 50 and 1000 mPas, and also high-boiling hydrocarbons, for example paraffin oils, dialkylbenzenes, dialkylnaphthalenes or mineral oils consisting of naphthenic and paraffinic units, polyglycols, especially polypropylene glycols which may optionally be substituted, high-boiling esters, for example phthalates, terephthalates, citric esters or diesters of dicarboxylic acids, liquid polyesters, polyacrylates or polymethacrylates, and also alkylsulfonic esters.

The plasticizers (F) are preferably room temperature liquid polydimethylsiloxanes end-capped by trimethylsiloxy groups, especially having viscosities at 25° C. in the range between 50 and 1000 mPas, and also high-boiling hydrocarbons, for example paraffin oils, dialkylbenzenes, dialkylnaphthalenes or mineral oils consisting of naphthenic and paraffinic units in the case of use of compounds (A2), and also polyglycols, especially polypropylene glycols, which may optionally be substituted, high-boiling esters, for example phthalates, terephthalates, citric esters or diesters of dicarboxylic acids, liquid polyesters, polyacrylates or polymethacrylates, and also alkylsulfonic esters in the case of use of compounds (A1).

If the inventive compositions comprise plasticizers (F), the amounts are preferably from 1 to 300 parts by weight, more preferably from 10 to 200 parts by weight, especially from 20 to 100 parts by weight, based in each case on 100 parts by weight of constituent (A). The inventive compositions preferably comprise plasticizers (F).

Examples of fillers (G) are nonreinforcing fillers, i.e. fillers with a BET surface area of up to 50 $m^2$/g, such as quartz, diatomaceous earth, calcium silicate, zirconium silicate, zeolites, metal oxide powders such as aluminum oxides, titanium oxides, iron oxides or zinc oxides or mixed oxides thereof, barium sulfate, calcium carbonate, gypsum, silicon nitride, silicon carbide, boron nitride, glass and polymer powders such as polyacrylonitrile powder; and reinforcing fillers, i.e. fillers with a BET surface area of more than 50 $m^2$/g, such as fumed silica, precipitated silica, precipitated calcium carbonate, carbon black, such as furnace black and acetylene black, and silicon-aluminum mixed oxides of high BET surface area; hollow spherical fillers, such as ceramic microspheres, for example those obtainable under the trade name Zeeospheres™ from 3M Deutschland GmbH in Neuss, Germany, elastic polymer spheres, for example those obtainable under the trade name EXPANCEL® from AKZO NOBEL, Expancel in Sundsvall, Sweden, or glass beads; fibrous fillers, such as asbestos and polymer fibers. The fillers mentioned may be hydrophobized, for example by treatment with organo-silanes or -siloxanes or with stearic acid, or by etherification of hydroxyl groups to alkoxy groups. If fillers (G) are used, they are preferably hydrophobic fumed silica and precipitated or ground calcium carbonate, the calcium carbonate added preferably being precipitated when (B0) is a ground calcium carbonate-containing filler, or the calcium carbonate added preferably being ground when (B0) is a precipitated calcium carbonate-containing filler.

If the inventive compositions comprise fillers (G), the amounts are preferably from 1 to 300 parts by weight, more preferably from 1 to 200 parts by weight, especially from 2 to 100 parts by weight, based in each case on 100 parts by weight of constituent (A). The inventive compositions preferably comprise fillers (G).

Examples of the adhesion promoters (H) used in the inventive compositions are organic compounds, silanes and organopolysiloxanes with functional groups, for example those with epoxy, glycidoxy, amino, imino, cyano, mercapto, hydroxyl, carboxyl, halogen, anhydride, amide, peptide or methacryloyloxy radicals, and also tetraalkoxysilanes and siloxanes containing T or Q groups, which may optionally comprise alkoxy groups. If, however, another component, for instance plasticizer (F) or crosslinker (E), already has the functional groups mentioned, it is possible to dispense with addition of adhesion promoters (H).

Adhesion promoters (H) are preferably silanes and organopolysiloxanes with alkoxy groups and at least one organic group containing functional radicals such as epoxy, glycidoxy, amino, imino or methacryloyloxy radicals, or organic compounds having at least one epoxy, glycidoxy, acryloyloxy or methacryloyloxy group.

If the inventive compositions comprise adhesion promoters (H), the amounts are preferably 0.1 to 50 parts by weight, more preferably 0.5 to 20 parts by weight, especially 1 to 10 parts by weight, based in each case on 100 parts by weight of constituent (A). The inventive compositions preferably comprise adhesion promoters (H).

The additives (I) optionally used in the inventive compositions may be any additives known to date.

Examples of additives (I) are pigments, dyes, fragrances, antioxidants such as sterically hindered phenols, e.g. 2,6-di-tert-butyl-4-methylphenol (BHT), 1,6-hexamethylene bis[3-(3,5-di-tert-butyl-4-hydroxyphenyl)propionate], 2,2'-methylenebis(4-ethyl-6-tert-butylphenol), 6,6'-di-tert-butyl-2,2'-thiodi-p-cresol, (2,4,6-trioxo-1,3,5-triazine-1,3,5(2H,4H,6H)-triyl)triethylene tris(3-(3,5-di-tert-butyl-4-hydroxyphenyl)propionate), 2,4,6-tris(3,5-di-tert-butyl-4-hydroxybenzyl)mesitylene, octadecyl-3-(3,5-di-tert-butyl-4-hydroxyphenyl)propionate, N,N'-hexane-1,6-diylbis[3-(3,5-di-tert-butyl-4-hydroxyphenylpropionamide], 1,3,5-tris(3,5-di-tert-butyl-4-hydroxybenzyl)-1,3,5-triazine-2,4,6(1H,3H,5H)trione, 2-tert-butyl-6-(3-tert-butyl-2-hydroxy-5-methylbenzyl)-4-methylphenyl acrylate, C7-C9-branched alkyl [3-(3,5-di-tert-butyl-4-hydroxyphenyl)]propionate, thiodiethylene bis[3-(3,5-di-tert-butyl-4-hydroxyphenyl)propionate], pentaerythrityl tetrakis(3-(3,5-di-tert-butyl-4-hydroxyphenyl)propionate), diethyl [[3,5-bis(1,1-dimethylene)-4-hydroxyphenyl]methyl]phosphonate, 1,2-bis(3,5-di-tert-butyl-4-hydroxyhydrocinnamoyl)hydrazine, 4,4'-thiobis(2-tert-butyl-5-methylphenol), 1,3,5-tris(4-tert-butyl-3-hydroxy-2,6-dimethylbenzyl)-1,3,5-triazine-2,4,6(1H,3H,5H)trione, polymer with sterically hindered phenol with CAS number 68610-51-5 and 2,2'-methylenebis[6-(1-methylcyclohexyl)-p-cresol] or vitamin E; fungicides, for example isothiazolinones, more particularly n-2-octyl-2H-isothiazolin-3-one, n-butyl-1,2-benz-isothiazolin-3-one or 4,5-dichloro-2-octyl-3(2H)-isothiazolin-3-one, 3-iodo-2-propynylbutyl carbamate, thiabendazole, carbendazim, 3-benzo[b]thien-2-yl-5,6-dihydro-1,4,2-oxathiazine 4-oxide, benzothiophene-2-cyclohexylcarboxamide S,S-dioxide, 2-thiazol-4-yl-1H-benzoimidazole, silver-containing carriers or nano-silver, triazole derivatives, such as tebuconazole, or combinations of two or three active ingredients; agents for influencing the electrical properties such as conductive carbon black; flame retardants; light stabilizers, e.g. benzotriazole derivatives such as 2-(5-chloro-2H-benzotriazol-2-yl)-6-(1,1-dimethylethyl)-4-methylphenol, 2,2'-(1,4-phenylene) bis(4H-3,1-benzoxazin-4-one), 2-(2H-benzotriazol-2-yl)-6-dodecyl-4-methylphenol, 2-(2H-benzotriazol-2-yl)-4,6-bis (1-methyl-1-phenylethyl)phenol, 2-(2'-hydroxy-3',5'-di-tert-amylphenyl)benzotriazole, 2-(2'-hydroxy-phenyl) benzotriazole, 2-(2-hydroxy-3-sec-butyl-5-tert-butylphenyl) benzotriazole, 2,2'-methylenebis[6-(2H-benzotriazol-2-yl)-4-(1,1,3,3-tetramethylbutyl)phenol], 2-(2'-hydroxy-3',5'-di-tert-butylphenyl)-5-chlorobenzotriazole, 2-(2'-hydroxy-5'-methylphenyl)benzotriazole, 2-(2H-benzotriazol-2-yl)-4-methyl-6-dodecylphenol, 2,4-di-tert-butyl-6-(5-chlorobenzotriazol-2-yl)phenol, 2-(2H-benzotriazol-2-yl)-4, 6-di-tert-pentylphenol, formamidines such as ethyl 4-[[(methylphenylamino)methylene]amino]benzoate, nano-metal oxides, for example of titanium, of iron and of zinc, the oxides of titanium being coated with silica and/or alumina, hydroxyphenyltriazines such as 2,4-bis(2,4-dimethylphenyl)-6-(2-hydroxy-4-isooctyloxyphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2-[4,6-bis (2,4-dimethylphenyl)-1,3,5-triazin-2-yl]-5-{3-[(2-ethylhexyl)oxy]-2-hydroxypropoxy}phenol and isooctyl 2-[4-[4, 6-bis[(1,1'-biphenyl)-4-yl]-1,3,5-triazin-2-yl]-3-hydroxyphenoxy]propanoate, oxaldianilides, such as N-(2-ethoxyphenyl)-N'-(2-ethylphenyl)ethylenediamide, N,N'-diphenylethylenediamide, N-(5-(1,1-dimethylethyl))-2-ethoxyphenyl)-N'-(2-ethylphenyl)ethylenediamide and N-(2-ethoxyphenyl)-N'-(4-isododecylphenyl)ethylenediamine; free-radical scavengers, for example sterically hindered amines (HALS), such as bis(2,2,6,6-tetramethyl-4-piperidyl) sebacate, 1,3,5-triazine-2,4,6-triamine-N,N'-[1,2-ethanediylbis[[[4,6-bis[butyl(1,2,2,6,6-pentamethyl-4-piperidinyl)amino]-1,3,5-triazin-2-yl]imino]-3,1-propanediyl]], 2,2,6,6-tetramethyl-4-piperidinyl esters of C12-21- and C18-unsaturated fatty acids, polymeric HALS with CAS No. 65447-77-0,3-dodecyl-1-(2,2,6,6-tetramethyl-4-piperidinyl)-2,5-pyrrolidinedione, poly[(6-morpholino-s-riazine-2,4-diyl)[2,2,6,6-tetramethyl-4-piperidyl) imino]hexamethylene [(2,2,6,6-tetramethyl-4-piperidyl) imino], poly[[6-[(1,1,3,3-tetramethylbutyl)amino]-1,3,5-triazine-2,4-diyl][(2,2,6,6-tetramethyl-4-piperidinyl)imino]-1,6-hexanediyl[(2,2,6,6-tetramethyl-4-piperidinyl)imino]], methyl-1,2,2,6,6-pentamethyl-4-piperidyl sebacate, bis(1,2, 2,6,6-pentamethyl-4-piperidyl)sebacate, bis(2,2,6,6-tetramethyl-4-piperidyl)sebacate, N,N-diphenyl-p-phenylenediamine, 1-ethyl-2,2,6,6-tetramethyl-4-piperidyl succinate polyester, bis(2,2,6,6-tetramethyl-1-octyloxy-4-piperidyl) sebacate and polymeric HALS with CAS number 192268-64-7; agents for prolonging skin formation time such as silanes having an SiC-bonded mercaptoalkyl radical; cell generators, e.g. azodicarbonamide, heat stabilizers such as triisodecyl phosphite, tris(nonylphenyl) phosphite or diisodecyl phenyl phosphite; so-called scavengers such as Si—N-containing silazanes or silylamides; and thixotropic agents, for example amide waxes, urea derivatives or hydrogenated castor oil.

If the inventive compositions comprise additives (I), they are preferably pigments, dyes, antioxidants, light stabilizers, fungicides, free-radical scavengers and thixotropic agents, more preferably pigments, fungicides, light stabilizers, free-radical scavengers and thixotropic agents.

If the inventive compositions comprise additives (I), the amounts are preferably 0.01 to 100 parts by weight, more preferably 0.05 to 30 parts by weight, especially 0.1 to 10 parts by weight, based in each case on 100 parts by weight of constituent (A). The inventive compositions preferably comprise additives (I).

Examples of organic solvents (L) are alcohols such as methanol, ethanol, isopropanol or dipropylene glycol; methyl ethyl ketoxime; esters such as butyl acetate, ethyl oleate, diethyl adipate, propylene carbonate, triethyl phosphate, glyceryl triacetate or dimethyl phthalate; ethers such as dipropylene glycol monomethyl ether, dipropylene glycol dimethyl ether, dioxane, tetrahydrofuran or butoxyethoxyethyl acetate; acetals such as dioxolane or butylal; sulfoxides such as dimethyl sulfoxide; pyrrolidones such as N-methyl-2-pyrrolidone or n-octyl-2-pyrrolidone; hydrocarbons such as hexane, cyclohexane, octane or dodecane; aromatics such as alkylnaphthenes or alkylbenzenes; or mixtures thereof.

The solvents (L) are preferably alcohols, ethers, acetals, sulfoxides, pyrrolidones, hydrocarbons, aromatics or mixtures thereof, more preferably alcohols, ethers, sulfoxides, aromatics or mixtures thereof.

If the inventive compositions comprise solvents (L), the amounts are preferably 0.1 to 10 parts by weight, more preferably 0.3 to 5 parts by weight, based in each case on 100 parts by weight of component (A). The inventive compositions preferably do not comprise any solvent (L).

More preferably, the inventive compositions are those comprising
(A) at least one crosslinkable compound,
(B) calcium carbonate-containing fillers (B0) surface-treated with carboxylic acids (C) of the formula (I), optionally
(D) catalyst,
optionally
(E) crosslinker,
optionally
(F) plasticizer,
optionally
(G) fillers,
optionally
(H) adhesion promoter,
optionally
(I) additives and
optionally
(L) organic solvent.

More particularly, the inventive compositions are those producible using
(A) at least one crosslinkable compound,
(B0) untreated calcium carbonate-containing fillers,
(C) carboxylic acids of the formula (I),
optionally
(D) catalyst,
optionally
(E) crosslinker,
optionally
(F) plasticizer,
optionally
(G) fillers,
optionally
(H) adhesion promoter,
optionally
(I) additives and
optionally
(L) organic solvent.

Preferably, the inventive compositions do not comprise any further constituents apart from components (A) to (L).

The inventive compositions are preferably viscous to pasty compositions.

The production can be effected in any manner known per se.

For instance, according to one process variant, 1, the filler (B) containing surface-treated calcium carbonate can be mixed with the other constituents (A) and optionally (D) to (L) in any sequence.

However, according to another process variant, 2, the untreated calcium carbonate-containing filler (B0) can be mixed with carboxylic acid (C) and the other constituents (A) and optionally (D) to (L) in any sequence, such that filler (B0) is coated with component (C) in situ. Preferably, in this process variant, carboxylic acid (C) is first mixed with constituent (A) and/or plasticizer (F) and/or solvent (L), optionally under reduced pressure, and then filler (B0) is added and coated with the carboxylic acid (C) by intimate mixing. Then the premixture can be mixed in any sequence with the other constituents.

The process according to the invention can be effected batchwise or continuously, and can preferably be performed at temperatures of 20 to 135° C., more preferably 20 to 80° C., especially at room temperature.

The process is preferably performed at the pressure of the surrounding atmosphere, i.e. about 900 to 1100 hPa. If desired, it is possible to mix temporarily or constantly under reduced pressure, for example at 30 to 500 hPa absolute, in order to remove volatile compounds and/or air.

Preference is given to effecting the inventive mixing of the individual constituents with very substantial exclusion of water.

The individual constituents of the inventive compositions may each either be one type of such constituents or a mixture of at least two different types of such constituents.

For the crosslinking of the inventive compositions, the typical water content of air is sufficient. The crosslinking of the inventive compositions is preferably effected at room temperature. It can, if desired, also be carried out at temperatures higher or lower than room temperature, for example at −5° to 15° C. or at 30° to 50° C. and/or by means of concentrations of water exceeding the normal water content of air. The crosslinking is preferably carried out at a pressure of from 100 to 1100 hPa, especially at the pressure of the surrounding atmosphere, i.e. from about 900 to 1100 hPa.

The present invention further provides shaped bodies produced by crosslinking the inventive compositions.

The inventive compositions can be used for all end uses for which materials which are storable with exclusion of water and crosslink to elastomers on ingress of water at room temperature can be used.

The inventive compositions thus have excellent suitability, for example, as sealants for joints, including vertical joints, and similar cavities of, for example, internal width 10 to 40 mm, for example of buildings, land vehicles, watercraft and aircraft, or as adhesives or cementing compositions, for example in window construction or in the production of glass cabinets and, for example, for production of protective coatings, or coatings which prevent sliding, or of elastomeric shaped bodies and for the insulation of electrical or electronic devices.

The inventive compositions have the advantage that they are easy to produce and have the additional advantage of exhibiting excellent curing characteristics. Furthermore, the inventive compositions have the advantage of very high storage stability, and the further advantage that, after crosslinking, they give rise to shaped bodies with reduced modulus and very good adhesion.

In the examples described below, all viscosities are based on a temperature of 25° C. Unless stated otherwise, the examples which follow are carried out at a pressure of the surrounding atmosphere, i.e., for instance, at 1000 hPa, and at room temperature, i.e. at about 23° C., or at a temperature which is established when the reactants are combined at room temperature without additional heating or cooling, and at a relative air humidity of about 50%. In addition, all parts and percentage figures, unless stated otherwise, are based on weight.

Hereinafter, the term "standard climatic conditions" shall mean 23° C.±2° C. and 50%±5% relative air humidity at the pressure of the surrounding atmosphere (860 hPa to 1060 hPa) and an air speed of less than or equal to 1 m/s.

Test 1:
Determination of Skin Formation Time

To determine the skin formation time, the crosslinkable compositions obtained in the examples are applied to PE film in a layer of thickness 2 mm and stored under standard climatic conditions. During the curing, the formation of a skin is checked every 5 min. For this purpose, a dry and grease-free finger is placed cautiously onto the surface of the sample and pulled upward. When sample remains stuck to the finger, no skin has formed yet. When no sample remains stuck to the finger any longer, a skin has formed and the time is noted.

Test 2:
Determination of Modulus

The modulus is the stress value at 100% elongation, measured on S2 test specimens according to DIN 53504-85

Test 3:
Assessment of Adhesion

The substrates to be tested are cleaned to remove adhering soil, and smooth surfaces are degreased with a suitable solvent. To determine the adhesion, the cross-linkable compositions obtained in the examples are applied to the substrates to be tested in a layer of thickness 2 mm and stored under standard climatic conditions for seven days. To test the adhesion, a piece of the vulcanizate of length about 1 cm is scraped off the substrate and pulled in the direction of the vulcanizate still adhering until failure. If the vulcanizate tears internally, the adhesion is acceptable and is rated 1. If some of the vulcanizate can be pulled off the substrate, the adhesion is rated 3. If the vulcanizate can be pulled off the substrate without residue, the adhesion is poor and is rated 5.

EXAMPLE 1

E1

Preparation of Polymer 1

970 g of a low-monol content poly(propylene glycol) diol with a mean molar mass of 18,000 g/mol, an OH number of 7.0 mg KOH/g, a polydispersity Mw/Mn of 1.1 and a viscosity of 23,000 mPas (commercially available from Bayer MaterialScience AG, Germany under the name "Acclaim Polyol 18200N"), 30 g of 3-isocyanato-propyltrimethoxysilane and 0.1 g of bismuth octoate were reacted at 90° C. for 1 hour, then 1 g of methanol was added to scavenge isocyanate residues. The reaction product was cooled to room temperature and stored with exclusion of moisture.

A clear, colorless product was obtained, with a viscosity of 35,000 mPas.

225 g of polymer 1 thus prepared, 3 g of poly(ethylene glycol) diacid with a mean molar mass of 600 g/mol (commercially available from Sigma-Aldrich Chemie GmbH, Germany), 20 g of a micronized hydrogenated castor oil (commercially available under the "Luvotix R" name from Lehmann & Voss, Germany) and 300 g of a ground natural marble with a mean particle size of 2 μm, a residual moisture content of max. 0.2%, a BET surface area of 5 m$^2$/g and a calcium carbonate content of 98.0% (and approx. 1.8% $MgCO_3$ and 0.2% $SiO_2$) are mixed with one another in a planetary mixer and stirred at approx. 100 mbar absolute for 15 minutes. The temperature after mixing is about 50° C. Subsequently, 360 g of a poly-propylene glycol monohydroxymonobutyl ether with a viscosity at 50° C. of 240 mPas and a water content, determined by means of Karl Fischer titration, of 120 ppm, 2.5 g of N-((dimethoxy)methylsilylmethyl) O-methylcarbamate (commercially available as Geniosil® XL 65 from Wacker Chemie AG, Munich, Germany) and 10 g of vinyltrimethoxysilane (commercially available as Geniosil® XL 10 from Wacker Chemie AG, Munich, Germany) are added and the mixture is stirred for a further 3 minutes. Subsequently, the mixture is completed by homogeneously mixing in 42 g of hydrophobic fumed silica with a specific surface area of 200 m$^2$/g (commercially available as HDK® H18 from Wacker Chemie AG, Munich, Germany), 9.0 g of 3-aminopropyl-trimethoxysilane (commercially available under the Geniosil® GF 96 from Wacker Chemie AG, Munich, Germany), 9.0 g of a liquid stabilizer mixture consisting of approximately 50% of a sterically hindered amine, principally consisting of bis(1,2,2,6,6-pentamethyl-4-piperidyl)sebacate and methyl 1,2,2,6,6-pentamethyl-4-piperidyl sebacate as a free-radical scavenger, and approximately 35% of a UV absorber of the benzotriazole type, principally consisting of 2-(2H-benzotriazol-2-yl)-4-methyl-6-dodecylphenol, and approximately 15% of a sterically hindered phenol, principally consisting of C7-C9-branched alkyl [3-(3,5-di-tert-butyl-4-hydroxyphenyl)] propionate as an antioxidant (commercially available Tinuvin® B 75 from Bodo Möller Chemie GmbH, Germany) and 2.5 g of dioctyltin dilaurate (commercially available as Wacker® catalyst C39 from Wacker Chemie AG, Munich, Germany). Finally, the mixture is stirred at approx. 100 mbar absolute for 5 minutes, dispensed air-tight into a 310 ml PE cartridge and stored.

After storage at room temperature for one day, tests 1 to 3 are conducted. The results can be found in table 1.

EXAMPLE 2

E2

The procedure described in example 1 was repeated, except that, instead of 3 g, 6 g of poly(ethylene glycol) diacid with a mean molar mass of 600 g/mol (commercially available from Sigma-Aldrich Chemie GmbH, Germany) were used.

After storage at room temperature for one day, tests 1 to 3 were conducted. The results can be found in table 1.

EXAMPLE 3

E3

The procedure described in example 1 was repeated, except that, instead of 3 g of poly(ethylene glycol) diacid with a mean molar mass of 600 g/mol, 2 g of poly(ethylene glycol) diacid with a mean molar mass of 250 g/mol (commercially available from Sigma-Aldrich Chemie GmbH, Germany) were used.

After storage at room temperature for one day, tests 1 to 3 were conducted. The results can be found in table 1.

EXAMPLE 4

E4

The procedure described in example 1 was repeated, except that, instead of 3 g of poly(ethylene glycol) diacid with a mean molar mass of 600 g/mol, 4 g of 2-[2-(2-methoxyethoxy)ethoxy]acetic acid (commercially available from Sigma-Aldrich Chemie GmbH, Germany) were used.

After storage at room temperature for one day, tests 1 to 3 were conducted. The results can be found in table 1.

EXAMPLE 5

E5

The procedure described in example 1 was repeated, except that, instead of 3 g of poly(ethylene glycol) diacid with a mean molar mass of 600 g/mol, 10.3 g of glycolic acid ethoxylate lauryl ether with a mean molar mass of 460 g/mol (commercially available from Sigma-Aldrich Chemie GmbH, Germany) were used.

After storage at room temperature for one day, tests 1 to 3 were conducted. The results can be found in table 1.

COMPARATIVE EXAMPLE 1

C1

The procedure described in example 1 was repeated, except that no poly(ethylene glycol) diacid with a mean molar mass of 600 g/mol was used.

After storage at room temperature for one day, tests 1 to 3 are conducted. The results can be found in table 1.

COMPARATIVE EXAMPLE 2

C2

The procedure described in example 1 was repeated, except that, instead of 3 g of poly(ethylene glycol) diacid with a mean molar mass of 600 g/mol, 2 g of neodecanoic acid (commercially available from ABCR GmbH, Germany) were used.

After storage at room temperature for one day, tests 1 to 3 were conducted. The results can be found in table 1.

COMPARATIVE EXAMPLE 3

C3

The procedure described in example 1 was repeated, except that, instead of 3 g of poly(ethylene glycol) diacid with a mean molar mass of 600 g/mol, 4 g of neodecanoic acid (commercially available from ABCR GmbH, Germany) were used.

After storage at room temperature for one day, tests 1 to 3 were conducted. The results can be found in table 1.

COMPARATIVE EXAMPLE 4

C4

The procedure described in example 1 was repeated, except that, instead of 3 g of poly(ethylene glycol) diacid with a mean molar mass of 600 g/mol (commercially available from Sigma-Aldrich Chemie GmbH, Germany), 4 g of dimer acid, hydrogenated with a mean molar mass of 570 g/mol (commercially available from Sigma-Aldrich Chemie GmbH, Germany) were used.

After storage at room temperature for one day, tests 1 to 3 were conducted. The results can be found in table 1.

COMPARATIVE EXAMPLE 5

C5

The procedure described in example 1 was repeated, except that, instead of 3 g of poly(ethylene glycol) diacid with a mean molar mass of 600 g/mol, 4 g of n-octanoic acid (commercially available from Sigma-Aldrich Chemie GmbH, Germany) were used.

After storage at room temperature for one day, tests 1 to 3 were conducted. The results can be found in table 1.

COMPARATIVE EXAMPLE 6

C6

The procedure described in example 1 was repeated, except that, instead of 3 g of poly(ethylene glycol) diacid with a mean molar mass of 600 g/mol, 1.3 g of acetic acid (commercially available from Sigma-Aldrich Chemie GmbH, Germany) were used.

After storage at room temperature for one day, tests 1 to 3 were conducted. The results can be found in table 1.

COMPARATIVE EXAMPLE 7

C7

The procedure described in example 1 was repeated, except that, instead of 3 g of poly(ethylene glycol) diacid with a mean molar mass of 600 g/mol, 3.4 g of a 50% solution of glycolic acid in methanol (commercially available from Sigma-Aldrich Chemie GmbH, Germany) were used.

After storage at room temperature for one day, tests 1 to 3 were conducted. The results can be found in table 1.

TABLE 1

| Examples | Test 1 (skin formation time) [min] | Test 2 Modulus [MPa] | Test 3 (concrete adhesion) |
|---|---|---|---|
| E1 | 30 | 0.50 | 1 |
| E2 | 40 | 0.48 | 1 |
| E3 | 25 | 0.52 | 3 |
| E4 | 25 | 0.47 | 1 |
| E5 | 30 | 0.34 | 1 |
| C1 | 30 | 0.54 | 3 |
| C2 | 40 | 0.62 | 1 |
| C3 | >60 | 0.67 | 1 |
| C4 | 40 | 0.54 | 1 |
| C5 | >60 | 0.52 | 1 |
| C6 | 45 | 0.53 | 5 |
| C7 | 50 | 0.54 | 5 |

EXAMPLE 6

E6

225 g of polymer 1 prepared in example 1, 3 g of poly(ethylene glycol) diacid with a mean molar mass of 600 g/mol (commercially available from Sigma-Aldrich Chemie GmbH, Germany), 20 g of a micronized hydrogenated castor oil (commercially available as "Luvotix R" from Lehmann & Voss, Germany) and 300 g of a precipitated calcium carbonate with a mean particle size of 0.1 μm (commercially available as "Precarb 100" from Schaefer Kalk KG, Germany) are mixed with one another in a planetary mixer and stirred at approximately 100 mbar absolute for 15 minutes. The temperature after mixing is about 55° C. Subsequently, 360 g of a polypropylene glycol monohydroxymonobutyl ether with a viscosity at 50° C. of 240 mPas and a water content, determined by means of Karl Fischer titration, of 120 ppm, 2.5 g of N-((dimethoxy)methylsilylmethyl) O-methylcarbamate (commercially available as Geniosil® XL 65 from Wacker Chemie AG, Munich, Germany) and 10 g of vinyltrimethoxysilane (commercially available as Geniosil® XL 10 from Wacker Chemie AG, Munich, Germany) are added and the mixture is stirred for a further 3 minutes. Subsequently, the mixture is completed by homogeneously mixing in 42 g of hydrophobic fumed silica with a specific surface area of 200 m$^2$/g (commercially available as HDK® H18 from Wacker Chemie AG, Munich, Germany), 9.0 g of 3-aminopropyltrimethoxysilane (commercially available as Geniosil® GF 96 from Wacker Chemie AG, Munich, Germany), 9.0 g of a liquid stabilizer mixture consisting of approximately 50% of a sterically hindered amine, principally consisting of bis(1,2,2,6,6-pentamethyl-4-piperidyl)sebacate and methyl 1,2,2,6,6-pentamethyl-4-piperidyl sebacate as a free-radical scavenger, approximately 35% of a UV absorber of the benzotriazole type, principally consisting of 2-(2H-benzotriazol-2-yl)-4-methyl-6-dodecylphenol, and approximately 15% of a sterically hindered phenol, principally consisting of $C_7$-$C_9$-branched alkyl [3-(3,5-di-tert-butyl-4-hydroxyphenyl)]propionate as an antioxidant (commercially available as Tinuvin® B 75 from Bodo Möller Chemie GmbH, and 2.5 g of dioctyltin dilaurate (commercially available as Wacker® catalyst C39 from Wacker Chemie AG, Munich, Germany). Finally, the mixture is stirred at approx. 100 mbar absolute for 5 minutes, dispensed air-tight into a 310 ml PE cartridge and stored.

After storage at room temperature for one day, tests 1 to 3 are conducted. The results can be found in table 2.

COMPARATIVE EXAMPLE 8

C8

The procedure described in example 6 was repeated, except that no poly(ethylene glycol) diacid with a mean molar mass of 600 g/mol was used.

After storage at room temperature for one day, tests 1 to 3 are conducted. The results can be found in table 2.

COMPARATIVE EXAMPLE 9

C9

The procedure described in example 6 was repeated, except that no poly(ethylene glycol) diacid with a mean molar mass of 600 g/mol was used and, instead of the precipitated calcium carbonate with a mean particle size of 0.1 μm, a precipitated and subsequently stearic acid-coated calcium carbonate with a mean particle size of 0.08 μm (commercially available as Hakuenka CCR name from Shiraishi Kogyo Kaisha, LTD., Japan).

After storage at room temperature for one day, tests 1 to 3 are conducted. The results can be found in table 2.

COMPARATIVE EXAMPLE 10

C10

The procedure described in comparative example 9 was repeated, except that 3 g of poly(ethylene glycol) diacid with a mean molar mass of 600 g/mol were additionally used.

After storage at room temperature for one day, tests 1 to 3 are conducted. The results can be found in table 2.

TABLE 2

| Examples | Test 1 (skin formation time) [min] | Test 2 (Modulus) [MPa] | Test 3 (concrete adhesion) |
|---|---|---|---|
| E6 | 30 | 0.67 | 1 |
| C8 | 40 | 0.71 | 1 |
| C9 | 30 | 0.53 | 5 |
| C10 | 40 | 0.54 | 5 |

EXAMPLE 7

E7

350 g of an alpha,omega-dihydroxypolydimethylsiloxane with a viscosity of 80,000 mPas, 200 g of an alpha, omega-bis(trimethylsiloxy)polydimethylsiloxane with a viscosity of 1,000 mPas and 3 g of 2-[2-(2-methoxy-ethoxy)ethoxy]acetic acid (commercially available from Sigma-Aldrich Chemie GmbH, Germany) are mixed with one another in a planetary dissolver for 3 min. Subsequently, 616 g of a ground natural marble with a mean particle size of 2 μm, a residual moisture content of max. 0.2%, a BET surface area of 5 g/m² and a calcium carbonate content of 98.0% (and approx. 1.8% $MgCO_3$ and 0.2% $SiO_2$) were added and stirred in for minutes. Thereafter, 15.0 g of 4-(triethoxysilylmethyl)tetrahydro-1,4-oxazine, 15 g of vinyltriethoxysilane, 12.0 g of a mixture of 1 part by weight of methyltriethoxysilane hydrolyzate oligomers with an average of 10 silicon atoms per molecule and 1 part by weight of 3-aminopropyltriethoxysilane, 12.0 g of 1,3,5-tris(3-trimethoxysilylpropyl) isocyanurate and 8.0 g of 3-glycidoxypropyltrimethoxy-silane were added and the mixture was mixed for 30 minutes. Subsequently, the mixture is completed by homogeneously mixing in 36 g of hydrophilic fumed silica with a BET surface area of 150 m²/g (commercially available as HDK® V15A from Wacker Chemie AG, Munich, Germany), 1.76 g of dioctyltin oxide in tetraisopropoxysilane (obtainable as "TK 217" from TIB Chemicals AG, Mannheim, Germany) and 4.0 g of a 50% by weight solution of octylphosphonic acid in methyltrimethoxysilane. To degas the mixture, a reduced pressure of approx. 200 hPa was applied and the mixture was mixed once again for 5 minutes. Thereafter, the finished mixture was dispensed into commercial polyethylene cartridges.

The characteristics of this mixture were determined analogously to example 1 and are compiled in table 3.

COMPARATIVE EXAMPLE 11

C11

The procedure described in example 7 was repeated, except that no 2-[2-(2-methoxyethoxy)ethoxy]acetic acid was used.

After storage at room temperature for one day, tests 1 to 3 were conducted. The results can be found in table 3.

EXAMPLE 8

E8

430 g of a polydimethylsiloxane mixture in which the siloxanes have been terminated with dimethoxymethylsilyl and dimethoxyvinylsilyl groups and the ratio of dimethoxymethylsilyl end groups to dimethoxyvinylsilyl end groups is about 1:1, having a viscosity of 80,000 mPas, 100 g of a trimethylsilyl end-capped polydimethylsiloxane with a viscosity of 1000 mPas and 3.0 g of 2-[2-(2-methoxyethoxy) ethoxy]acetic acid (commercially available from Sigma-Aldrich Chemie GmbH, Germany) are mixed with one another in a planetary dissolver for 3 min. Subsequently, 400 g of a ground natural marble with a mean particle size of 2 μm, a residual moisture content of max. 0.2%, a BET surface area of 5 g/m² and a calcium carbonate content of 98.0% were added and stirred in for 5 minutes. Subsequently, the mixture is completed by homogeneously mixing in 12.0 g of diisobutoxybis(ethylacetoacetato)titanium (commercially available as TYZOR® IBAY from DuPont™), 4.0 g of methyltrimethoxysilane, 2.0 g of a polyethylene glycol-polypropylene glycol block copolymer with a viscosity of 700 mPas and 50 g of fumed silica with a specific surface area of 150 m²/g (commercially available as HDK® V15 from Wacker Chemie AG). Finally, the mixture was stirred at approx. 100 mbar absolute for 5 minutes, dispensed air-tight and stored.

The characteristics of this mixture were determined analogously to example 1 and are compiled in table 3.

COMPARATIVE EXAMPLE 12

C12

The procedure described in example 8 was repeated, except that no 2-[2-(2-methoxyethoxy)ethoxy]acetic acid was used.

After storage at room temperature for one day, tests 1 to 3 were conducted. The results can be found in table 3.

TABLE 3

| Examples | Test 1 [min] | Test 2 [MPa] | Test 3 (concrete adhesion) |
|---|---|---|---|
| E7 | 15 | 0.70 | 1 |
| C11 | 15 | 0.82 | 1 |
| E8 | 25 | 0.48 | 3 |
| C12 | 20 | 0.52 | 5 |

The invention claimed is:
1. A crosslinkable composition comprising
(A) at least one crosslinkable compound selected from the group consisting of compounds (A1) of formula

$$A\text{-}[(CR^1{}_2)_b\text{—}SiR_a(OR^2)_{3-a}]_x \qquad (II)$$

where
A is an x-valent polymer radical bonded via nitrogen, phosphorus, oxygen, sulfur, carbon or a carbonyl group,
R are identical or different and are monovalent, optionally substituted hydrocarbyl radicals,
$R^1$ are identical or different and are hydrogen or a monovalent, optionally substituted hydrocarbyl radical which may be attached to the carbon atom via nitrogen, phosphorus, oxygen, sulfur or a carbonyl group,
$R^2$ are identical or different and are hydrogen or a monovalent, optionally substituted hydrocarbyl radical,
x is an integer from 1 to 10,
a is 0, 1 or 2 and
b is an integer from 1 to 10
with the proviso that at least two $OR^2$ groups per molecule are present, and
compounds (A2) of the formula

$$R^5{}_c Z_d SiO_{(4-c-d)/2} \quad (III)$$

where
$R^5$ are identical or different and each is an optionally substituted hydrocarbyl radical which may be interrupted by oxygen atoms,
Z are identical or different and are a hydroxyl radical or hydrolyzable radical,
c is 0, 1, 2 or 3 and
d is 0, 1, 2 or 3
with the proviso that the sum of c+d is less than or equal to 4 and at least two Z radicals are present per molecule; and
(B) a calcium carbonate-containing filler (B0) surface-treated with carboxylic acids (C) of the formula

$$R^4-(OCR^3{}_2-C(=O)OH)_y \quad (I)$$

where
$R^3$ are identical or different and are hydrogen or a monovalent, optionally substituted hydrocarbyl radical,
$R^4$ is a y-valent, carbon-bonded, optionally substituted hydrocarbyl radical which may be interrupted by oxygen atoms, and
y is an integer from 1 to 3.

2. The crosslinkable composition of claim 1, wherein the calcium carbonate-containing fillers comprise ground natural limestone with a calcium carbonate content of more than 85% by weight, natural marble with a calcium carbonate content of more than 85% by weight and precipitated calcium carbonate with a calcium carbonate content of more than 95% by weight.

3. The crosslinkable composition of claim 2, wherein the carboxylic acids (C) are one or more of 3,6-dioxaheptanoic acid, 3,6,9-trioxadecanoic acid, 3,6-dioxaoctanedioic acid, 3,6,9-trioxaundecanedioic acid, poly(ethylene glycol) diacid with a molar mass of approx. 600 g/mol, glycolic acid ethoxylate 4-tert-butylphenyl ether with a mean molar mass of approximately 380 g/mol and glycolic acid ethoxylate lauryl ether with a mean molar mass of approximately 360 g/mol or approximately 460 g/mol.

4. The crosslinkable composition of claim 1, wherein the carboxylic acids (C) are one or more of 3,6-dioxaheptanoic acid, 3,6,9-trioxadecanoic acid, 3,6-dioxaoctanedioic acid, 3,6,9-trioxaundecanedioic acid, poly(ethylene glycol) diacid with a molar mass of approx. 600 g/mol, glycolic acid ethoxylate 4-tert-butylphenyl ether with a mean molar mass of approximately 380 g/mol and glycolic acid ethoxylate lauryl ether with a mean molar mass of approximately 360 g/mol or approximately 460 g/mol.

5. The crosslinkable composition of claim 1, wherein the composition contains component (B) in amounts of 5 to 300 parts by weight, based on 100 parts by weight of component (A).

6. The crosslinkable composition of claim 1, comprising
(A) at least one crosslinkable compound,
(B) calcium carbonate-containing fillers surface-treated with carboxylic acids (C) of the formula (I),
(D) optionally a catalyst,
(E) optionally a crosslinker,
(F) optionally a plasticizer,
(G) optionally filler(s),
(H) optionally adhesion promoter(s),
(I) optionally a additives, and
(L) further optionally organic solvent.

7. A process for producing a crosslinkable composition of claim 6, comprising mixing filler (B) containing surface-treated calcium carbonate with constituents (A) and optionally (D) to (L) in any sequence.

8. A process for producing a crosslinkable composition of claim 6, wherein untreated calcium carbonate-containing filler is mixed with carboxylic acid (C) and the other constituents (A) and optionally (D) to (L) in any sequence, such that filler is coated with component (C) in situ.

9. A shaped body produced by crosslinking a crosslinkable composition of claim 6.

10. A shaped body produced by crosslinking a crosslinkable composition of claim 1.

* * * * *